United States Patent [19]

Sato

[11] Patent Number: 5,125,592
[45] Date of Patent: Jun. 30, 1992

[54] TAPE TRANSPORT SYSTEM WITH SERVO GAIN RESPONSIVE TO DETECTED TAPE TENSION

[75] Inventor: Tsuguo Sato, Kanagawa, Japan

[73] Assignee: Sony Corporation, Tokyo, Japan

[21] Appl. No.: 629,395

[22] Filed: Dec. 18, 1990

[30] Foreign Application Priority Data

Dec. 18, 1989 [JP] Japan .................... 1-327841

[51] Int. Cl.[5] ...................... G11B 15/43; G11B 15/28; B65H 77/00; B65H 23/18
[52] U.S. Cl. ..................... 242/189; 360/71; 242/190; 318/7
[58] Field of Search .............. 242/189, 190, 75.51; 318/6, 7; 360/71, 73.09, 73.14

[56] References Cited

U.S. PATENT DOCUMENTS

| | | | |
|---|---|---|---|
| 3,746,278 | 7/1973 | Dennis et al. | 242/75.51 |
| 4,065,074 | 12/1977 | Anderson et al. | 242/75.51 |
| 4,129,810 | 12/1978 | Harshberger, Jr. | 318/6 |
| 4,513,229 | 4/1985 | Kudelski | 318/7 |
| 4,565,952 | 1/1986 | Kaiko | 318/6 |
| 4,720,661 | 1/1988 | Kisakibaru et al. | 318/6 |
| 4,740,732 | 4/1988 | Way | 318/7 |

Primary Examiner—Daniel P. Stodola
Assistant Examiner—John Q. Nguyen
Attorney, Agent, or Firm—Lewis H. Eslinger; Donald S. Dowden

[57] ABSTRACT

A tape transport apparatus is comprised of a friction type capstan servo block having a friction type capstan driven by a capstan motor controlled by a capastan servo circuit in response to a control signal for determining a velocity of the capstan and a pulse signal generated in response to a rotation of the capstan motor, a reel servo block having a supply reel and a take-up reel driven by a supply and take-up reel motor controlled by a supply reel and take-up reel control circuit respectively, first and second tape tension detectors for detecting tape tension of the tape locating between the capstan and supply reel and between the capstan and take-up reel respectively, a control voltage generator for generating a control voltage, a tape tension control data generating circuit having a memory, the memory having a plurality of back tension characteristics data each of which is changed in response to the pulse signal so that the back tension of the supply reel motor is controlled in response to an outlet signal of the first tape tension detector and the velocity of the capstan motor and that a tape tension by the take-up reel is controlled in response to the control voltage and an output of the second tape tension detector, and a memory control circuit having a current detector for detecting a drive current of the capstan motor and a circuit for selecting one of the plurality of back tension characteristics data in response to an output signal of the current detector so that tape tensions at an entrance position and at an exit position of the friction capstan can be controlled to become approxiamtely the same regardless of the change of atmospheric conditions.

4 Claims, 13 Drawing Sheets

F I G. 13
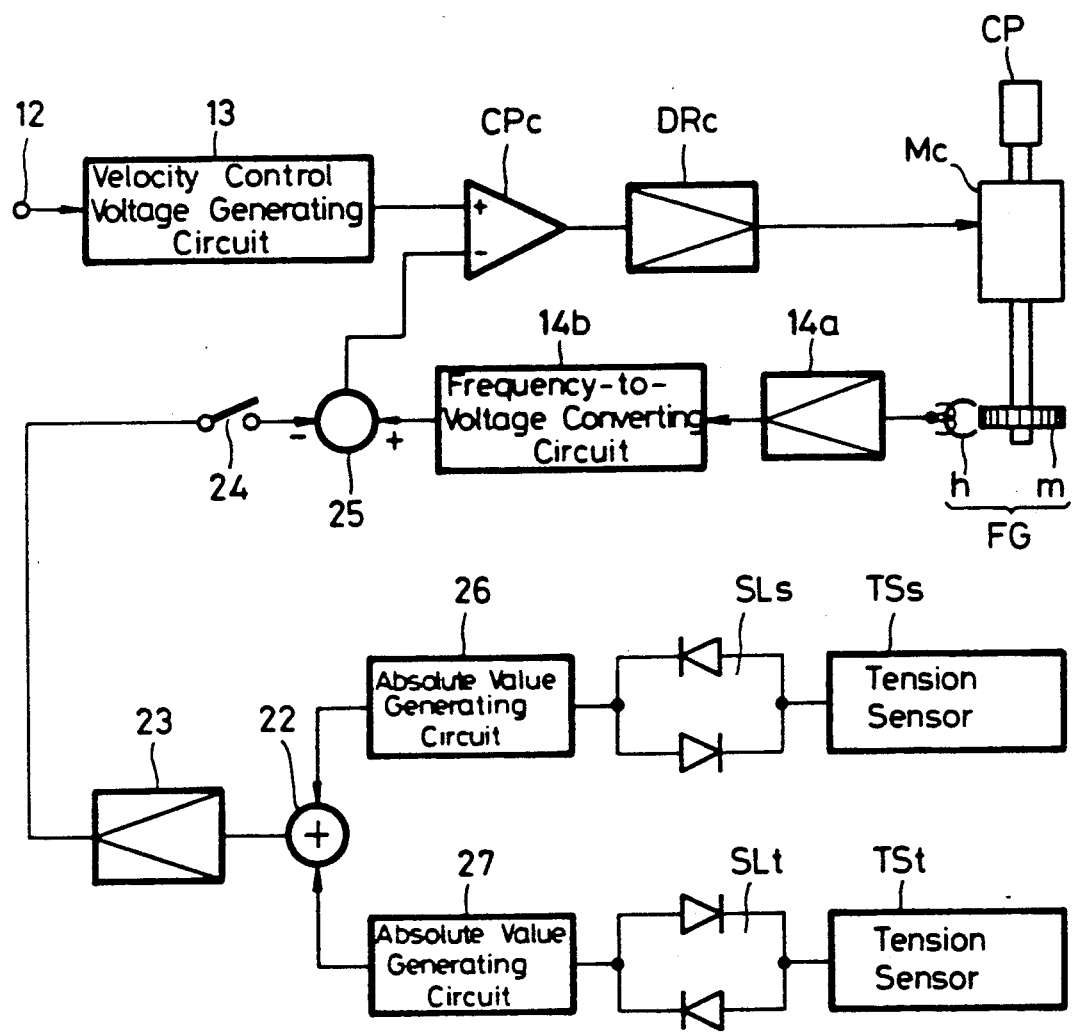

F I G. 14
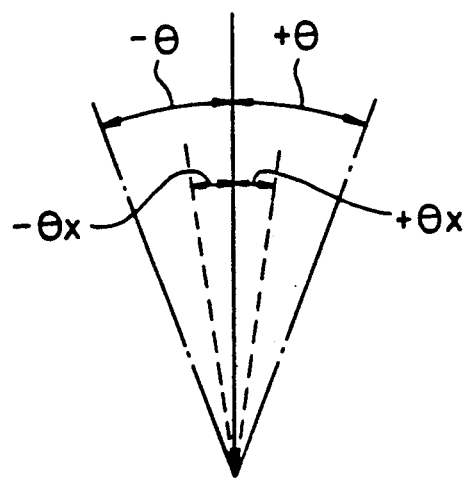
F I G. 15
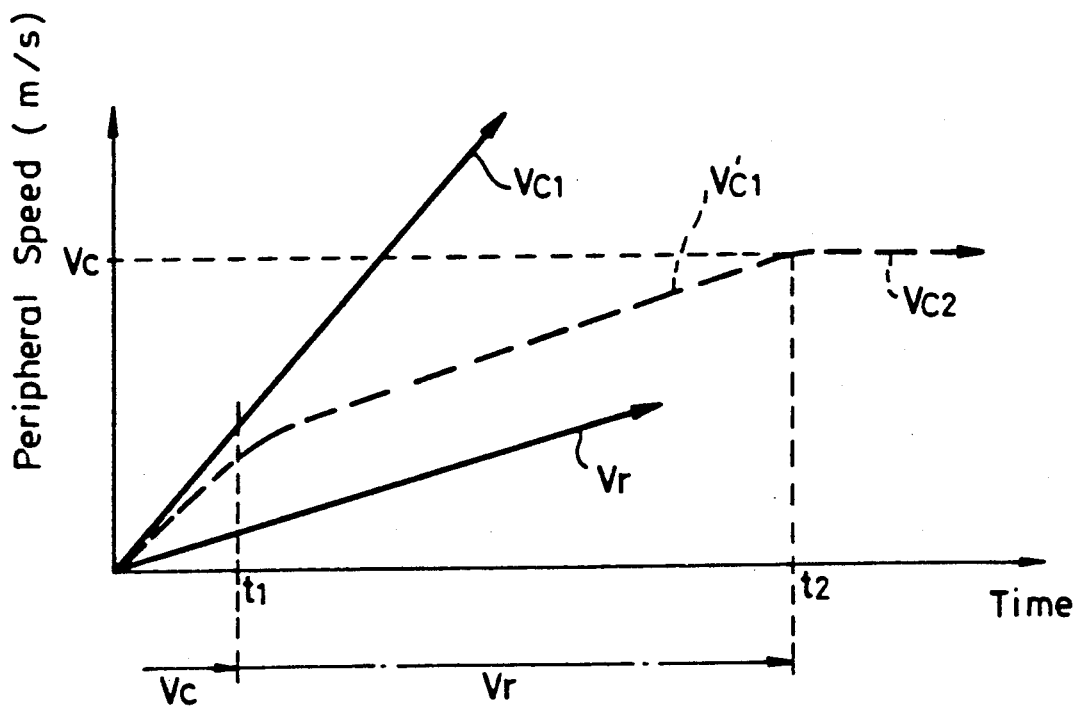

TAPE TRANSPORT SYSTEM WITH SERVO GAIN RESPONSIVE TO DETECTED TAPE TENSION

BACKGROUND OF THE INVENTION

1. Field of the Invention

The present invention generally relates to tape transport apparatus and, more particularly to a tape transport apparatus of a friction type capstan drive system for use with a video tape recorder (VTR) or the like.

2. Description of the Prior Art

RELEVANT ART 1

Conventionally, a tape recorder of a friction type capstan drive system is proposed to transport a tape by a friction force between a capstan and a tape without using a pinch roller (see Japanese Patent Laid-Open Gazette No. 57-105843, U.S. Pat. No. 4,807,107 and so on).

A tape transport system of a conventional digital video tape recorder (i.e. digital VTR) of a friction capstan drive system will hereinafter be described with reference to FIG. 1.

Referring to FIG. 1, a supply reel SR is rotated by a drive motor Ms, and a take-up reel TR is rotated by a drive motor Mt. A tape guide drum DR is composed of a stationary lower drum and a rotating upper drum and a rotating magnetic head is mounted on the rotating upper drum (not shown). Tape guides G9 and G1 guide a magnetic tape TP so that the magnetic tape TP is obliquely wrapped around the tape guide drum DR, and a tape wrapping angle is restricted, for example, to about 180 degrees by the tape guides G9 and G1. The tape wrapping angle is not limited to 180 degrees and may be freely determined in the designing.

A friction capstan CP is made of a material having a relatively large friction coefficient such as a rubber or the like, and the magnetic tape TP is wrapped around one portion of the circumferential area of the friction capstan CP by tape guides G2 and G3. The friction capstan CP is rotated by a drive motor Mc.

The magnetic tape TP supplied from the supply reel SR travels through tape guides G6, G7, a supply reel side tension arm TAs, the tape guides G8, G9, the tape guide drum DR, the tape guide G1, a magnetic head Hc, the tape guide G2, the capstan CP, the tape guide G3, a take-up reel side tension arm TAt and tape guides G4 and G5, in that order and rewound by the take-up reel TR.

The tension arms TAs and TAt are used to detect tape tension, are spring-biased by spring members and are provided with tension sensors (not shown).

A servo system in the tape transport system of the conventional digital video tape recorder of a friction capstan drive system will be explained with reference to FIG. 2.

A servo system for servo-controlling the drive motor Mc which rotates the friction capstan CP will be explained first.

Referring to FIG. 2, a tape speed control signal is applied to an input terminal 12 and a velocity control voltage generating circuit 13 generates a control voltage corresponding to the tape speed in response to the tape speed control signal. This control voltage is supplied to a level comparator CPc.

A frequency generator FG is composed of a multipolar magnet disk m rotatable in accordance with the rotation of the motor Mc and a stationary magnetic head h opposing the multipolar magnet disk m. A revolution rate detection signal from the reproducing magnetic head h is supplied through an amplifier 14a to a frequency-to-voltage (F/V) converting circuit 14b whose output voltage is supplied to the level comparator CPc, in which it is compared in level with the above-mentioned velocity control voltage. A compared output from the level comparator CPc is supplied to a motor driving circuit DRc which then supplies a driving current in accordance with the compared output to the motor Mc, whereby the motor Mc for the capstan CP is rotated at a peripheral velocity (equal to the tape transport speed) corresponding to the tape speed control signal supplied to the input terminal 12.

A servo circuit for servo-controlling the supply reel motor Ms and the take-up reel motor Mt will be described with reference to FIG. 2.

As shown in FIG. 2, a take-up side control voltage generating circuit 10 is adapted to generate a control voltage, and this control voltage is supplied to a level comparator CPt or CPs via change-over switches SW2 and SW1 which are changed in position in a ganged relation to each other by a switching control signal applied to an input terminal 11 in response to the forward or reverse direction of the transport of the magnetic tape TP. The revolution rate detection voltage supplied from the frequency-to-voltage converter 14b to detect the revolution rate of the capstan motor Mc, that is, a magnetic tape transport speed detection voltage (the velocity control voltage from the velocity control voltage generating circuit 13 may be used) is supplied to an analog-to-digital (A/D) converter 15, in which it is converted to a digital signal and fed to a memory 16 as an address signal. A supply reel side control voltage in response to the tape transportation speed that was stored beforehand in the memory 16 is read out and converted into an analog voltage by a digital-to-analog (D/A) converter 17. Then, a resultant analog reference tension voltage is supplied through the change-over switch SW1 or SW2 to the level comparator CPs or CPt.

There are provided tension sensors TSs and TSt which detect the tensions of supply side and take-up side tension arms TAs and TAt shown in FIG. 1 and which are adapted to provide supply real side and take-up reel side tape tension detection voltages to the level comparator CPs or CPt, in which they are compared in level with the supply side control voltage from the D/A converter 17. Compared outputs therefrom are supplied to driving circuits DRs and DRt, from which drive currents are respectively supplied to the motors Ms and Mt which rotate the supply reel SR and the take-up reel TR.

An operation of the servo system of the conventional video tape recorder of FIG. 2 will be explained next with reference to FIG. 1 and characteristic graphs forming FIGS. 3A and 3B.

As shown in FIG. 1, assuming the friction capstan CP of the magnetic tape TP as a boundary, then Tfs represents tape tension of the supply reel SR side, Tft represents tape tension of the take-up reel TR side, Tms represents a tension (i.e. back tension) applied to the magnetic tape TP by the supply reel motor Ms and Tmt represents a tension (rewinding tension) applied to the magnetic tape TP by the take-up reel motor Mt, respectively.

When the magnetic tape TP is transported in, for example, the fast forward mode, a drive current is supplied to the take-up reel motor Mt so that the tension Tmt applied to the magnetic tape TP by the take-up reel motor Mt becomes constant, that is, an equality of Tmt=Tft is established (FIG. 3A).

At that time, since a friction loss coefficient K that the magnetic tape TP receives between the capstan CP and the supply reel SR is changed in the order of K=K1, K2, . . . Kn in response to the condition that the transport speed (equal to the peripheral velocity of the capstan CP) v of the magnetic tape TP is changed in the order of v=v1, v2, . . . vn, a drive current is supplied to the supply reel motor Ms so that the magnetic tape TP is supplied with a back tension of Tms=Tfs/K in which Tfs becomes constant on the basis of a relationship of Tfs=K Tms (FIG. 3A). Therefore, since Tms=Tfs/K, supply reel side control voltages (voltages, which result from dividing Tfs by any one of the coefficients K=K1, K2, . . . Kn) corresponding to addresses of the tape transport velocity detection voltages corresponding to the tape transport speeds v=v1, v2, . . . vn are stored in the above-mentioned memory 16 as a data table, read out therefrom in response to the tape transport speed and supplied through the D/A converter 17 and the change-over switch SW1 to the level comparator CPs.

However, the above-mentioned friction coefficient K is considerably changed not only due to the transport velocity of the magnetic tape TP but also due to temperature, humidity or the like. Accordingly, the tension Tms applied to the magnetic tape TP by the supply reel motor Ms in the respective transport speeds v=v1, v2, . . . vn of the magnetic tape TP is changed as $$Tms = Tfs/K$$

$$Tms = Tfs'/(K+\Delta K)$$

$$Tms = Tfs''/(K-\Delta K)$$

in response to coefficients K, K+ΔK and K=K−ΔK corresponding to the changes of temperature, humidity or the like as shown in FIG. 3B. Consequently, since the tape tensions Tfs and Tft of the magnetic tape TP at both sides of the capstan CP are different, positive and negative loads are applied to the capstan motor Mc. In order to enable the magnetic tape TP to run under such degraded condition, the friction coefficient of the capstan CP, particularly, the friction coefficient of the circumferential surface of the capstan CP must be increased to provide a large margin in a tape drive force.

RELEVANT ART 2

In the conventional digital video tape recorder of a friction type capstan drive system (see FIG. 1), as shown in FIG. 4A, a peripheral acceleration of the drive motor Mc of the friction capstan CP is considerably high compared with peripheral accelerations of the drive motors Ms and Mt of the supply reel SR and the take-up reel TR (accelerations are different depending upon the size of the cassette tape, that is, large, average and small cassette tapes). FIG. 4A shows peripheral speeds of the capstan CP and the reel motors Ms and Mt relative to time, that is, a relationship between the revolution rates thereof, and respective inclinations represent accelerations.

As a result, if the peripheral speed of the capstan motor Mc is increased and/or decreased by the maximum acceleration (in the case of the small cassette tape) of the capstan motor Mc when the magnetic tape TP is transported at high speed, angles of the tension arms TAs and TAt exceed normal operation angle ranges so that it becomes impossible to control the tension applied to the magnetic tape TP by the rotations of the reel motors Ms and Mt.

FIG. 4B shows characteristics of maximum peripheral accelerations of smaller accelerations of the supply reel motor Ms and the take-up reel TR when the tape winding diameters of the take-up reel TR of large, average and small cassette tapes are changed as minimum, average and maximum in that order.

As is easily understood from the maximum peripheral acceleration characteristics of FIG. 4B, the peripheral accelerations of the reel drive motors Ms and Mt are considerably affected by the inertial forces of the magnetic tape TP wrapped around the reels SR and TR rather than the inertial forces of the motors themselves so that, in the conventional digital video tape recorder using cassette tapes of different sizes, that is, large, average and small cassette tapes, the size of the tape cassette of the cassette tape loaded onto the digital video tape recorder is detected to determine the peripheral acceleration of the capstan drive motor Mc such that this peripheral acceleration may not exceed the peripheral accelerations of the reel drive motors Ms and Mt.

As is clear from FIG. 4B, the inertial forces of the reel motors Ms and Mt are considerably changed by the winding diameters of the magnetic tape TP wrapped around the reels SR and TR even though the cassette tape has the tape cassette of the same size. While the characteristic is improved in the intermediate diameter as compared with the minimum and maximum diameters of the reels SR and TR, the peripheral acceleration of the capstan motor Mc is constant so that, when the tape cassette of the cassette tape is the average size, the characteristics of the reel motors Ms and Mt cannot be effectively utilized in the cross-hatched area in FIG. 4B.

RELEVANT ART 3

While the tension arm TA (TAs and TAt) used in the conventional digital video tape recorder of the friction type capstan drive system (see FIG. 1) is rotated about a supporting point CT as shown in FIG. 5, a spring force of a spring SP which spring-biases the arm TA when the operation angle of the arm TA is changed as θ1, θ2, θ3, θ4, . . . , θn is proportional to the operation angle thereof as shown in FIG. 6. Let it be assumed that when the digital video tape recorder is set in the playback mode, or when the magnetic tape TP is transported in the positive direction, the operation angle of the arm TA is taken as, for example, θ3. When in the servo loop relative to the reel motors Ms and Mt, the accuracy that the reel motors Ms and Mt at a certain loop gain ($G_0$) provided for the magnetic tape TP falls in a range of θ3±Δθ and g1±Δg1 in a tension value, the loop gain $G_0$ must be increased as much as possible in order to increase the accuracy of the tension. However, the higher the loop gain $G_0$ is increased, the smaller the phase margin becomes. There is then the substantial risk that the servo system becomes unstable.

In order to remove the above-mentioned disadvantage, a tension arm AT shown in FIG. 7 is proposed, in which one end of the spring SP is attached to the intermediate portion of the arm AT, the other end of the spring SP is attached to one portion of a sector gear GR1 and the sector gear GR1 is driven by a stepping motor M via a small gear GR2 meshed with the sector gear GR1. According to the above-mentioned arrangement, the operation angles of the tension arm TA in the respective modes such as reverse direction transport mode, positive direction transport mode and stop mode are rotated about one central point of $\theta 1$ to $\theta n$ in the left and right and the characteristic of the change of the spring force of the spring SP becomes gentle as compared with that of the FIG. 6 as shown in FIG. 8. Consequently, in the servo system for the reel motors Ms and Mt, if the loop gain is such that the accuracy of tension applied to the magnetic tape falls within a range of $\pm \Delta \theta$ similarly to the case of FIG. 6, then the loop gain becomes $g1 \pm \Delta g2$, thus increasing the tension accuracy as compared with the case of FIG. 6. In that case, the stability of servo system can be selectively made important while the loop gain is lowered from a design standpoint.

However, if the loop gain is simply lowered to G2 from G1, then a servo band is lowered from SB1 to SB2 as shown in FIG. 9 which illustrates angular frequency characteristics of gain and phase. Therefore, although the stability of the servo system is increased, a transient response characteristic is degraded.

As described in the first relevant art 1, when the magnetic Tape TP is transported, for example, in the fast forward mode by the tape transport apparatus of the friction type capstan drive system, the drive current is supplied to the take-up reel motor Mt such that the back tension Tmt applied to the magnetic tape TP by the take-up reel motor Mt becomes constant, that is, the equality of Tmt=Tft is established (FIG. 3A).

At that time, since the total friction loss coefficient K that the magnetic tape TP receives between the capstan CP and the supply reel SR is changed as K=K1, K2, . . . , Kn each time the transport velocity v of the magnetic tape TP is changed as v=v1, v2, . . . , vn, the current is supplied to the supply reel motor Ms so that the magnetic tape TP is applied with the tension Tms=Tfs/K where Tfs becomes constant on the basis of the relationship of Tfs=K.Tms (FIG. 3A). Therefore, since Tms=Tfs/K, reference digital tension voltages (voltages, which result from dividing Tfs by any one of the coefficients K=K1, K2, . . . Kn) corresponding to addresses of the tape transport velocity detection voltages corresponding to the tape transport speeds v=v1, v2, . . . vn are stored in the above-mentioned memory 16 as data table, read out therefrom in response to the tape transport velocity and supplied through the D/A converter 17 and the change-over switch SW1 to the level comparator CPs.

However, the above-mentioned friction coefficient K is considerably changed not only due to the transport velocity of the magnetic tape TP but also due to temperature, humidity or the like. Accordingly, the tension Tms applied to the magnetic tape TP by the supply reel motor Ms in the respective transport speeds v=v1, v2, . . . vn of the magnetic tape TP is changed as $Tms = Tfs/K$ $Tms = Tfs'/(K+\Delta K)$ $Tms = Tfs''/(K-\Delta K)$ in response to coefficients K, K+$\Delta K$ and K=K−$\Delta K$ corresponding to the changes of temperature, humidity or the like as shown in FIG. 3B. Here, it is to be noted that tape tension values on the ordinate of FIG. 3B are expressed by normalized values. Consequently, since the tape tensions Tfs and Tft of the magnetic tape TP at both sides of the capstan CP become different, positive and negative loads are applied to the capstan motor Mc. In order to enable the magnetic tape TP to run under such degraded condition, the friction coefficient of the capstan CP, particularly, the friction coefficient of the circumferential surface of the capstan CP must be increased to provide a large margin to a tape drive force.

In accordance with the second relevant art 2, as is clear from FIG. 4B, the inertial forces of the reel motors Ms and Mt are considerably changed by the winding diameters of the magnetic tape TP wrapped around the reels SR and TR even though the cassette tape has the tape cassette of the same size. While the characteristic is improved in the intermediate diameter as compared with the minimum and maximum diameters of the reels SR and TR, the peripheral acceleration of the capstan motor Mc is constant so that, when the tape cassette of the cassette tape is the average size, the characteristics of the reel motors Ms and Mt cannot be effectively utilized in the cross-hatched area in FIG. 4B.

OBJECTS AND SUMMARY OF THE INVENTION

Accordingly, it is a general object of the present invention to provide an improved tape transport apparatus which can eliminate the aforenoted shortcomings and disadvantages encountered with the prior art.

More specifically, it is an object of the present invention to provide a tape transport apparatus in which a revolution rate of a capstan can be increased and decreased by the maximum acceleration characteristic regardless of the change of amount of tape wrapped around the tape reels.

It is another object of the present invention to provide a tape transport apparatus in which a tape speed can be controlled with high accuracy regardless of the tape transport speed so that the tape can be transported stably.

It is a further object of the present invention to provide a tape transport apparatus in which when angular errors of tension arms are large, a servo band can be made sufficiently wide, while when the angular errors are small, a stable servo loop can be formed.

As a first aspect of the present invention, a tape transport apparatus is comprised of a friction type capstan servo block having a friction type capstan driven by a capstan motor controlled by a capstan servo circuit in response to a control signal for determining a velocity of the capstan and a pulse signal generated in response to a rotation of the capstan motor, a reel servo block having a supply reel and a take-up reel driven by supply and take-up reel motors controlled by a supply reel and take-up reel control circuit respectively, first and second tape tension detectors for detecting tape tension of the tape located between the capstan and supply reel and between the capstan and take-up reel respectively, a control voltage generator for generating a control voltage, a tape tension control data generating circuit having a memory, the memory having a plurality of back tension characteristics data each of which is changed in response to the pulse signal so that the back tension of the supply reel motor is controlled in response to an output signal of the first tape tension detector and the velocity of the capstan motor and that a tape tension of the take-up reel is controlled in response to the control voltage and an output of the second tape tension detector, and a memory control circuit having a current detector for detecting a drive current of the capstan motor and a circuit for selecting one of the plurality of back tension characteristics data in response to an output signal of the current detector so that tape tensions at an entrance position and at an exit position of the friction capstan can be controlled to become approximately the same regardless of the change of atmospheric conditions.

In accordance with a second aspect of the present invention, a tape transport apparatus is comprised of a friction type capstan servo block having a friction type capstan driven by a capstan motor controlled by a capstan servo circuit, the capstan servo circuit comprising a velocity control device manually operated for generating a velocity control pulse signal so as to control a velocity of the capstan motor, a tension detecting circuit for detecting tape tensions at supply reel and take-up reel positions, and a digital low-pass filter having a time constant determined from a table of reference data of the time constant, wherein the time constant is changed in response to the tape tension so as to induce data with respect to the tape tension into the capstan servo circuit so that an acceleration of the capstan motor becomes equal for both of the supply and take-up reels.

These and other objects, features and advantages of the present invention will become apparent in the following detailed description of illustrative embodiments to be taken in conjunction with the accompanying drawings, in which like reference numerals are used to identify the same or similar parts in the several views.

BRIEF DESCRIPTION OF THE DRAWINGS

FIG. 13 is a schematic block diagram of a second embodiment of the tape transport system according to the present invention, and illustrating one portion of the servo system thereof;

FIG. 14 is a schematic diagram of an angle of a tension arm, and to which references will be made in explaining an operation of the second embodiment of the present invention;

FIG. 15 is a graph of time versus peripheral speed, and to which references will be made in explaining the second embodiment of FIG. 14;

DETAILED DESCRIPTION OF THE PREFERRED EMBODIMENTS

Figure 10:
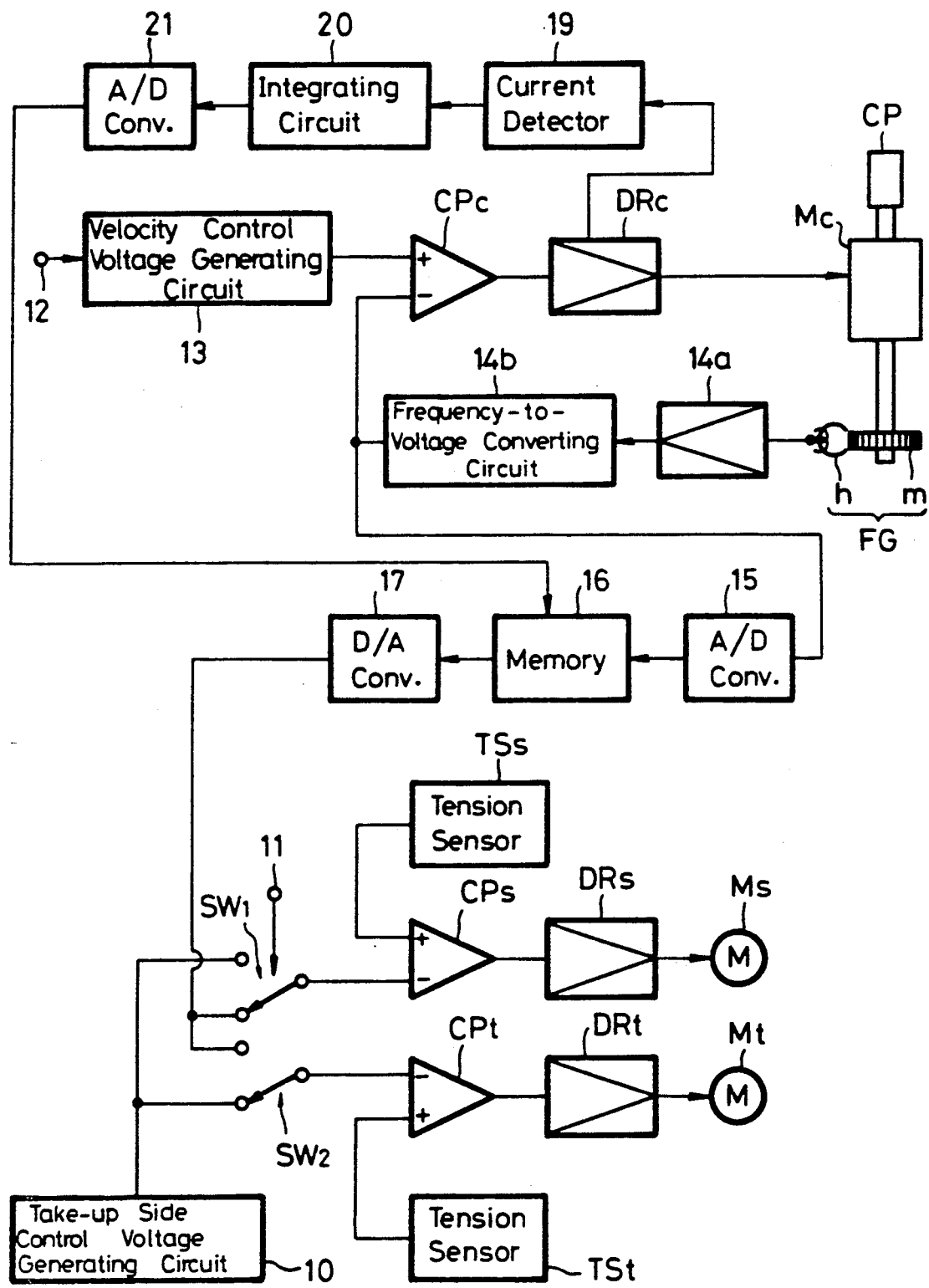
FIG. 10 is a block diagram of a first embodiment of a tape transport apparatus according to the present invention, and illustrating a servo system thereof.

Referring to the drawings in detail, and initially to FIG. 10, a servo system for servo-controlling a capstan motor, that is, a first embodiment of the present invention will be described hereinafter. In FIG. 10, like parts corresponding to those of FIG. 2 are marked with the same references and therefore need not be described in detail.

Referring to FIG. 10, the take-up reel side control voltage generating circuit 10 is adapted to generate the control voltage and the control voltage therefrom is supplied to the level comparator CPt or CSt via the change-over switches SW1 or SW2 that are changed in position in a ganged relation to each other by the switching control signal from the input terminal 11 in response to the forward or reverse transport direction of the magnetic tape TP. Further, the revolution rate detection voltage of the capstan motor Mc from the frequency-to-voltage converter 14b, that is, the magnetic tape transport velocity detection voltage (the velocity control voltage from the velocity control voltage generating circuit 13 may be used) is supplied to the A/D converter 15, in which it is converted to the digital signal and is fed to the memory 16 as the address signal. The tension control voltage corresponding to the tape transport speed and stored beforehand in the memory 16 is read out therefrom and is converted into the analog voltage by the D/A converter 17. This resultant analog supply side control voltage is supplied through the change-over switch SW1 or SW2 to the level comparator CPs or CPt.

Figure 1:
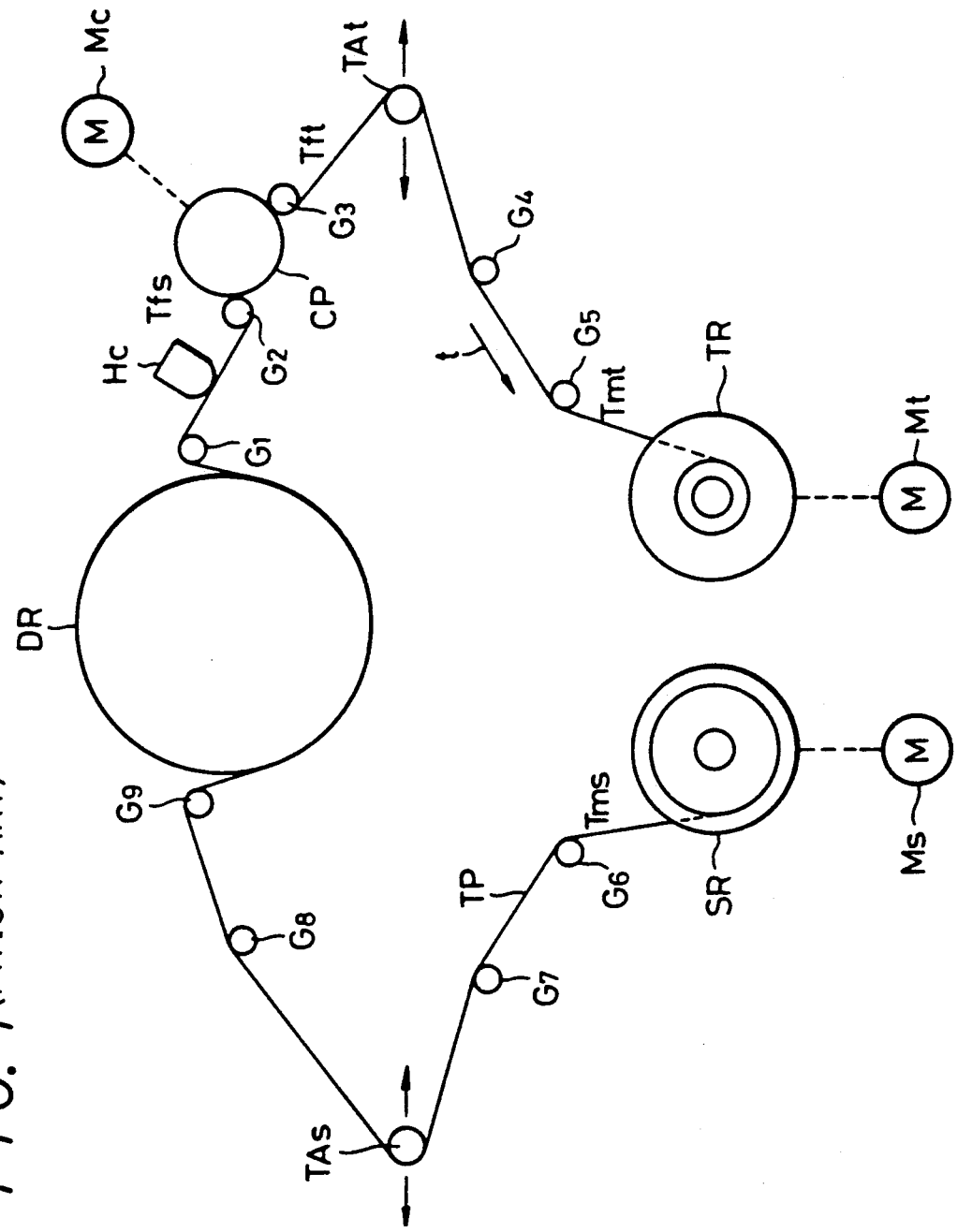
FIG. 1 is a schematic diagram showing an arrangement of a tape transport system of a conventional digital video tape recorder.

Further, the supply side tension sensor and take-up side tension sensor TSs and TSt of the tension arms TAs and TAt shown in FIG. 1 are provided, and the supply side and take-up side tape tension detection voltages therefrom are supplied to the level comparator CPs or CPt, in which they are compared with the tape transport velocity detection voltage from the D/A converter 17. The compared output therefrom is supplied to the driving circuit DRs or DRt, and the drive current therefrom is supplied to the supply reel or take-up reel motor Ms or Mt.

Figure 2:
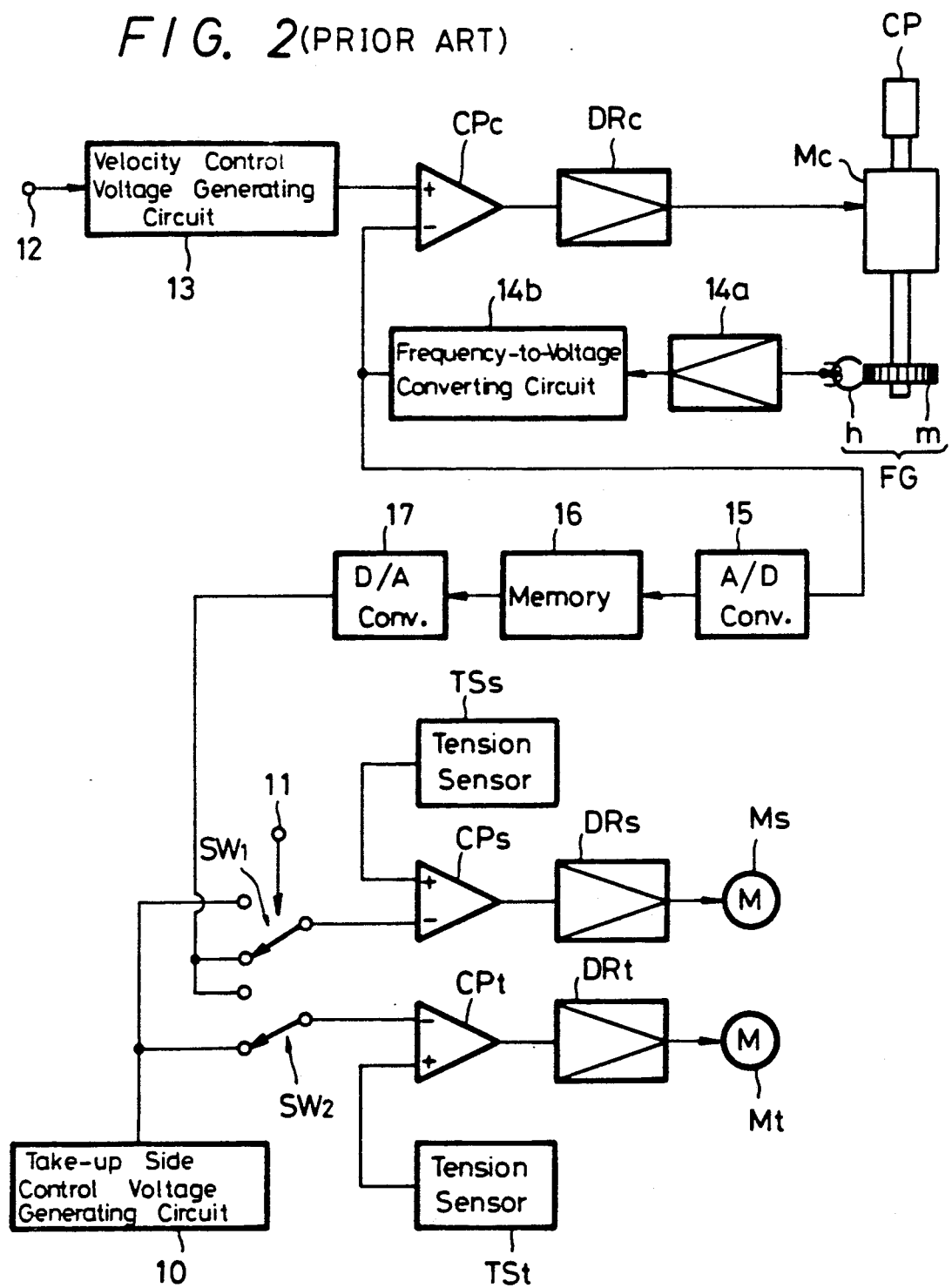
FIG. 2 is a schematic block diagram showing a servo system of the conventional digital video tape recorder.

The above-mentioned arrangement is similar to that of FIG. 2. In this embodiment, noticing that the change of balances of the supply reel and take-up reel tape tensions Tfs and Tft is changed across the capstan CP by the change of load of the capstan CP, the change of load on the capstan CP is detected as the change of the drive current that drives the capstan motor Mc.

Figure 11A:
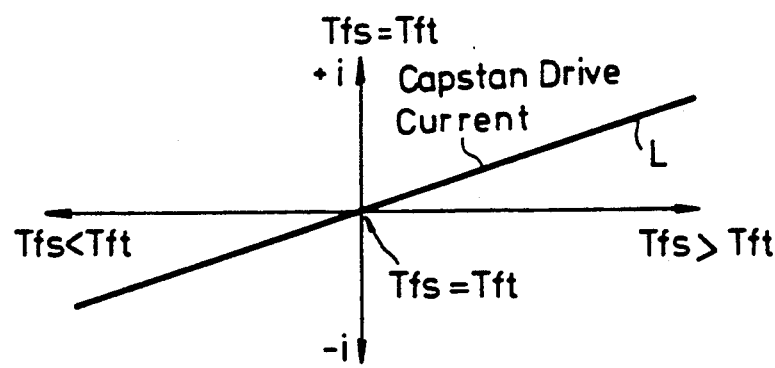
FIGS. 11A–11C are schematic diagrams used to explain an operation of the first embodiment of FIG. 10.

FIG. 11A shows a relationship between the change of balances of the tape tensions Tfs and Tft and the drive current which drives the capstan motor Mc. As shown in FIG. 11A, when the equality of Tfs=Tft is established, the capstan motor Mc is applied with no load and the drive current becomes zero. If the tape tension Tfs becomes larger than the tape tension Tft, the absolute value of the drive current is increased in the positive direction, while if the tape tension Tfs become smaller than the tape tension Tft, the absolute value of the drive current becomes larger in the negative direction. It is to be noted that when the capstan motor Mc is applied with no load, this means that the necessary torque is zero, in which case the capstan servo is still effected. Accordingly, the capstan servo is effected by the drive voltage so that, even when the current is zero, the capstan motor Mc is rotated to transport the magnetic tape TP.

For this reason, a current detecting circuit 19 for detecting the drive current supplied to the capstan motor Mc is provided to detect the drive current from the drive amplifier DRc. Then, a drive current detection signal from the current detecting circuit 19 is supplied to an integrating circuit 20 to be integrated, and an integrated signal therefrom is supplied to an A/D converter 21, in which it is converted into a digital signal. Then, this digital signal is supplied to the memory 16 as an address signal.

An operation of the servo system according to the embodiment of FIG. 10 will be explained below with reference to FIGS. 11A-11C and FIGS. 12 and 1.

In the tape transport system of the present embodiment, similarly to the example of the prior art shown in FIG. 1, Tfs represents the supply reel SR side tape tension of the friction capstan CP, TFt represents the take-up reel side tape tension, Tms represents the tension applied to the magnetic tape TP by the supply reel motor Ms and Tmt represents the tape tension applied to the magnetic tape TP by the take-up reel motor Mt, respectively. Incidentally, while the magnetic tape TP is transported, the tape tensions Tfs and Tft at both sides of the capstan CP are made equal to each other.

Figure 3A:
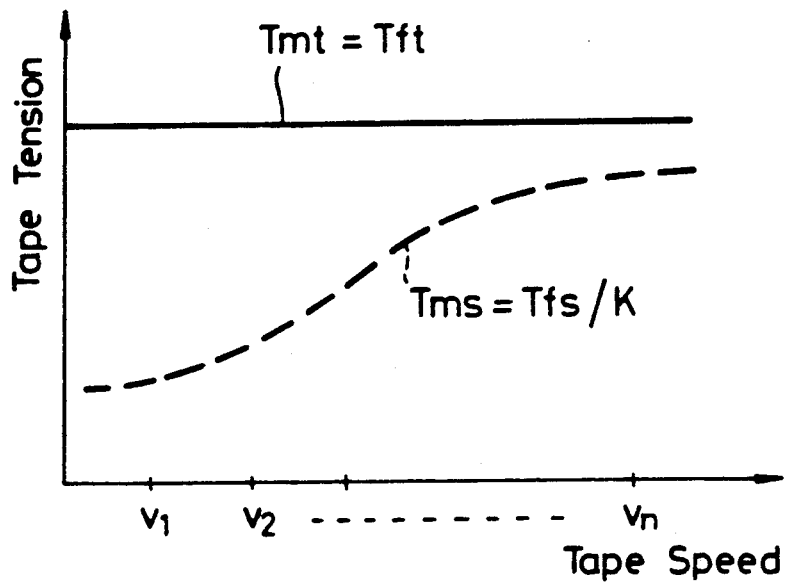
FIGS. 3A and 3B are graphs of tape speed versus tape tension, and to which references will be made in explaining the servo system of the example of the prior art shown in FIG. 2.
Figure 3B:
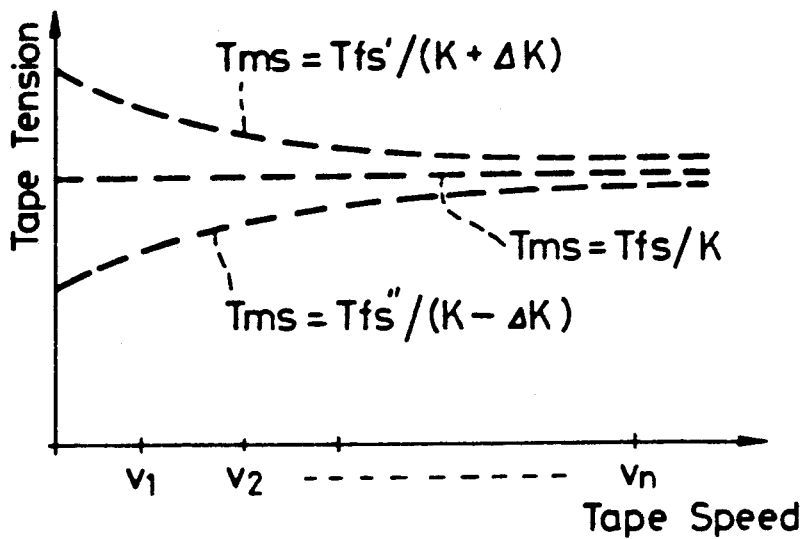
Figure 4A:
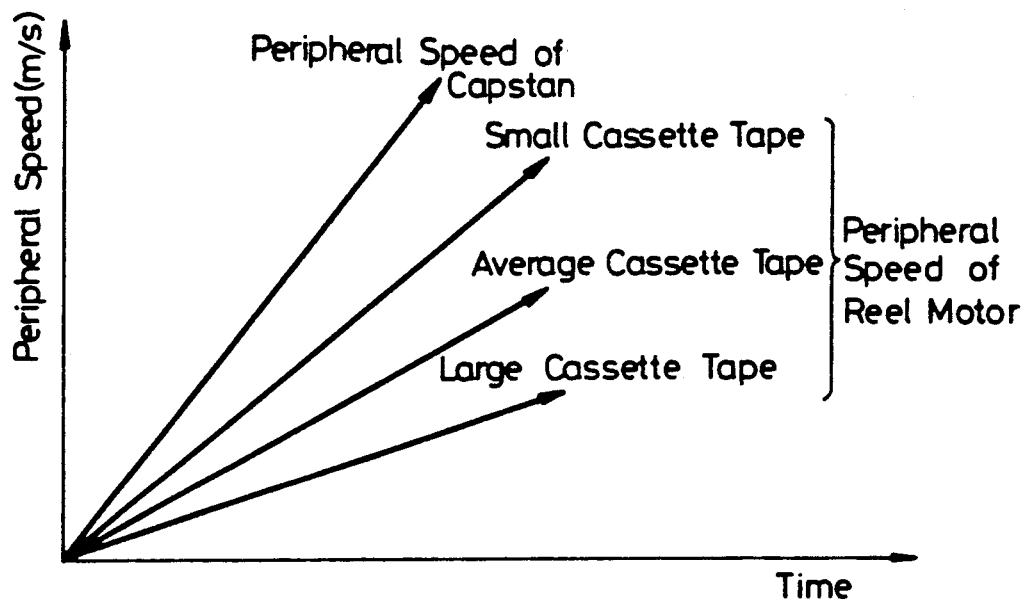
FIGS. 4A and 4B are graphs to which references will be made in explaining an operation of the servo system of the example of the prior art shown in FIG. 2.
Figure 4B:
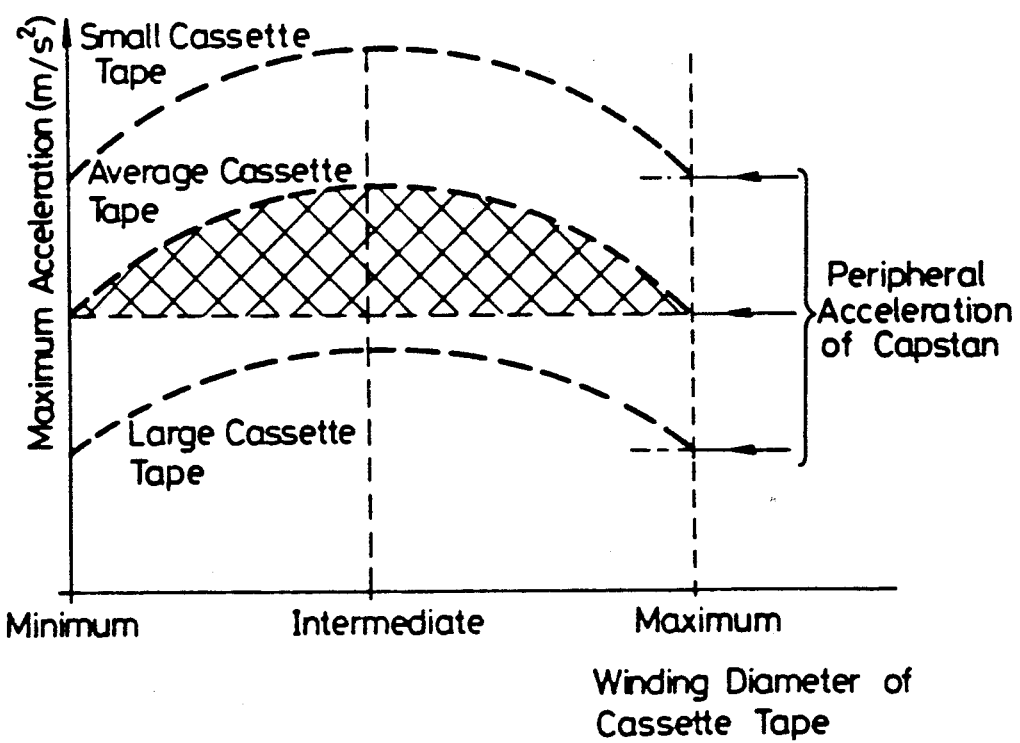
Figure 5:
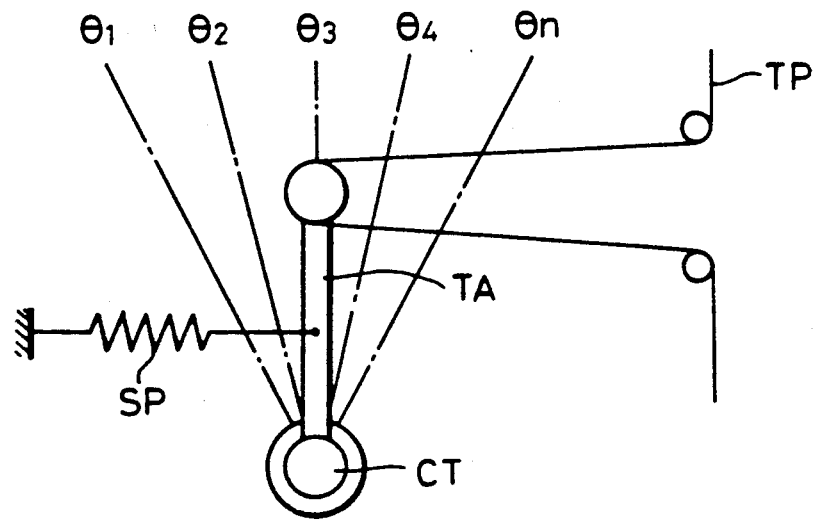
FIG. 5 is a schematic diagram used to explain an operation of the tension arm of the example of the tape transport system of the conventional digital video tape recorder shown in FIG. 1.

When the magnetic tape TP is transported in the fast forward mode, the drive current is supplied to the take-up reel motor Mt so that the tape tension Tmt applied to the magnetic tape TP by the take-up reel motor Mt becomes constant, that is, the equality of Tmt=Tft is established (see FIG. 3A).

At that time, since the total friction loss coefficient K that the magnetic tape TP receives between the capstan CP and the supply reel SR is changed as K=K1, K2, ..., Kn each time the transport velocity v of the magnetic tape TP is changed as v=v1, v2, ..., vn in response to the drive current which drives the capstan motor Mc, back tensions Tms (shown by reference letters A to E of FIG. 11B) by which the tape tension Tfs becomes constant on the basis of the relationship of Tfs=K.Tms are stored beforehand in the memory 16, and the back tensions Tms are read out from the memory 16 by the address signal corresponding to the transport velocity of the magnetic tape TP and the drive current i (FIG. 11A) of the capstan motor Mc. The thus read-out back tension Tms is supplied to the D/A converter 17, in which it is converted into an analog signal and is supplied through the change-over switch SW1 or SW2 to the level comparator CPs or CPt, thereby being compared with the detection outputs from the tension sensors TSs and TSt. The compared outputs are supplied to the drive ampifier DRs or DRt from which drive current is supplied to the reel motor Ms or Mt.

Figure 11B:
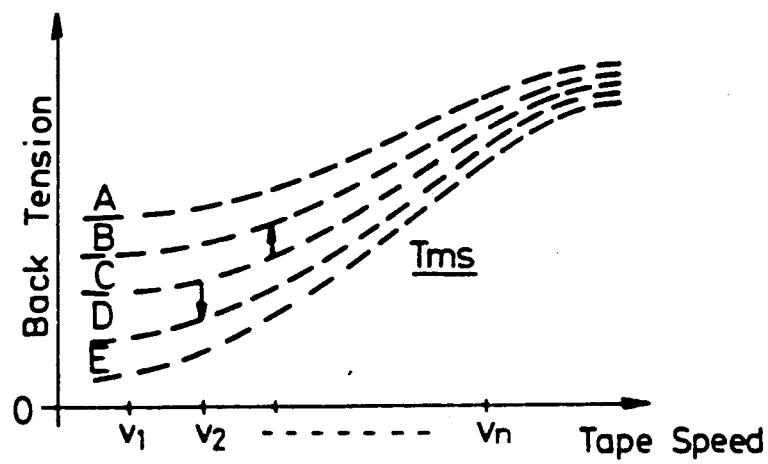
Figure 11C:
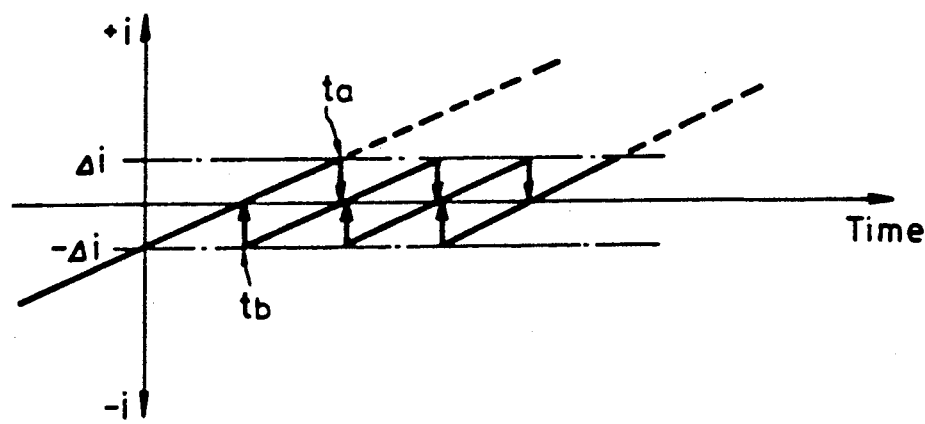

FIG. 11C illustrates the condition that the back tensions Tms of A to E of FIG. 11B are moved when the drive current i of the capstan motor Mc is changed about, for example, 0 to $+\Delta i$ and $-\Delta i$.

More specifically, as shown in FIG. 11A, when the torque Tfs of the tape supply side becomes larger than the torque Tft of the tape take-up side, the drive current i of the capstan motor is increased in the positive direction along the capstan drive current straight line L. The increase of the drive current i is detected by the current detector 19, and the thus detected information is supplied through the integrating circuit 20 and the A/D converter 21 to the memory 16 as an address information. When the drive current i is zero, the tape supply side back tension Tms is read out from the memory 16 so that it is changed along the curve C of FIG. 11B in response to the tape transport velocity. When the drive current i is increased and exceeds $\Delta i$ at a time point ta shown in FIG. 11C, the memory 16 is controlled such that the back tension Tms is changed from the curve C to the curve D as shown by an arrow in FIG. 11B. By this control of the memory 16, the supply reel side back tension Tms is reduced and the equality of Tfs=Tft is established, that is, the supply reel side back tension becomes equal to the take-up side back tension, making the drive current zero again.

Conversely, when the supply reel side tension becomes smaller than the take-up reel side tension, the drive current i is changed to the negative side in FIG. 11A. Further, when this drive current i exceeds $-\Delta i$ at, for example, time point tb in FIG. 11C, this change of the drive current i is transmitted to the memory 16 as the change of address. Accordingly, the memory 16 is operated so that the back tension curve is changed from the curve C to the curve B shown in FIG. 11B to thereby increase the supply reel side tension Tfs.

Figure 12:
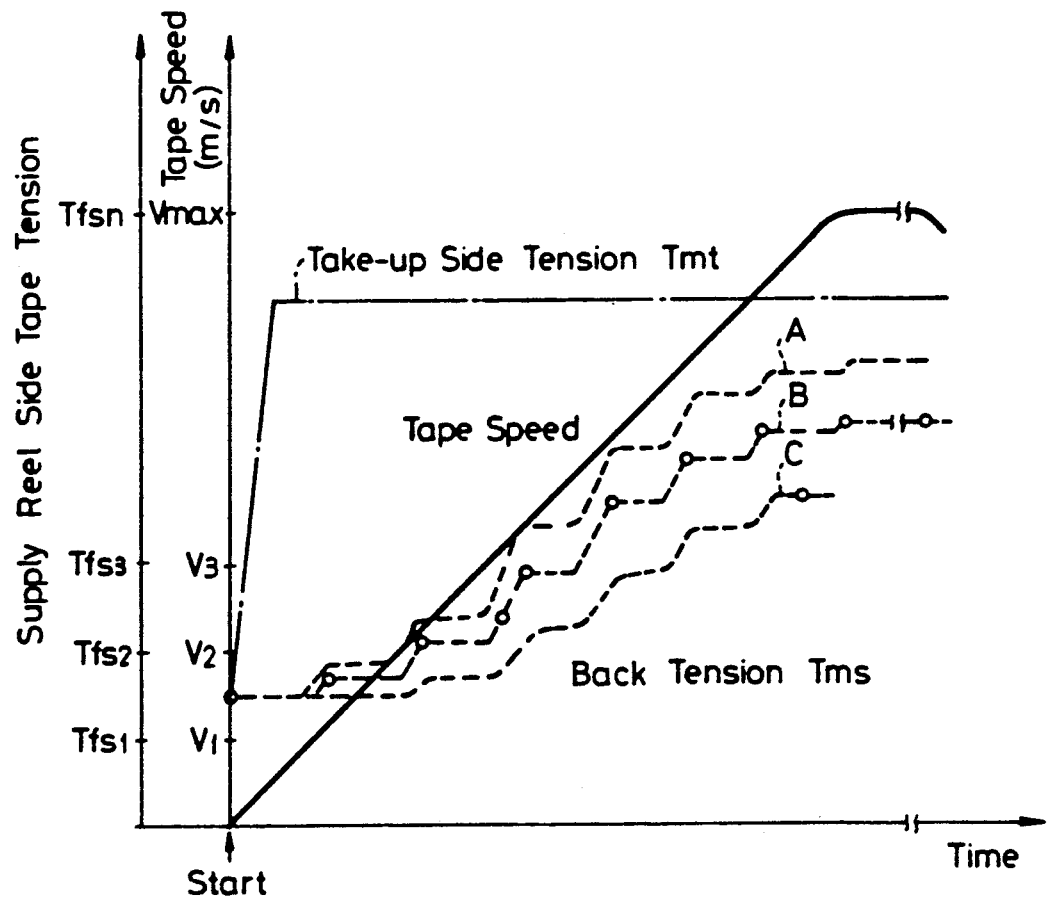
FIG. 12 is a graph used to explain the operation of the embodiment of FIG. 10.

FIG. 12 illustrates that, when the transport velocity of the magnetic tape TP is increased with time, the take-up reel side tension Tmt applied to the magnetic tape TP by the take-up reel motor Mt increases rapidly in the first stage and then becomes constant, while the back tension Tms applied to the magnetic tape TP by the supply reel motor Ms changes stepwise as shown by curves A, B and C corresponding to the drive currents of the capstan motor Mc. In FIG. 12, the abscissa represents the time and the ordinate represents the tape transport velocity and the supply reel side tape tension Tfs. Further, in FIG. 12, reference numerals Tfs1, Tfs2, Tfs3, ..., Tfsn represent supply reel side tape tensions provided when the tape transport velocity is v1, v2, v3, ..., vmax respectively.

A second embodiment of the servo system according to the present invention will hereinafter be explained with reference to FIG. 13. In FIG. 13, like parts corresponding to those of FIG. 10 are marked with the same references and therefore need not be described in detail.

Referring to FIG. 13, tension detected outputs from the take-up side and supply side tension detectors TSs and TSt are respectively supplied through bipolar limiters SLs, SLt and absolute value generating circuits 26, 27 to an adder 22. An added output from the adder 22 is supplied through an amplifier 23 and an ON-OFF switch 24 to a subtracter 25, in which it is subtracted from the output of the frequency-to-voltage converting circuit 14b. A subtracted output is supplied to the level comparator CPc. Other arrangements are similar to those of FIG. 10.

An operation of the second embodiment will be explained below with reference also to FIGS. 14 and 15.

In this embodiment, the tape transport system of the video tape recorder is similar to the example of the prior art of FIG. 1 and let it be assumed that a rotational angle of each of the take-up side and supply side tension arms TAt and TAs is rotated within a range of $\pm \theta$ as shown in FIG. 14. When the rotational angle of the tension arm falls within a range of $\pm \theta x$ (where $\theta$ and $\theta x$ are both positive numbers and an inequality of $\theta > \theta x$ is established), the limiters SLs and SLt are not operated. When the rotational angle exceeds this range of $\pm \theta x$, the limiters SLs and SLt are operated so that the detected outputs from the tension sensors TSs and TSt are limited by these limiters SLs and SLt. The thus limited outputs from the limiters SLs and SLt are supplied to the absolute value generating circuits 26 and 27 whose absolute values are supplied to the adder 22. An added value from the adder 22 shows a fluctuation amount of each of the supply reel side and take-up reel side tension arms. Data of this fluctuation amount is supplied through the amplifier 23 and the ON-OFF switch 24 to a minus (−) input terminal of the subtracter 25. Therefore, a response characteristic of the servo system shown in FIG. 13 is changed by this fluctuation amount, thereby acceleration of the capstan motor being obtained as shown by a dashed line V'c1 in FIG. 15.

In FIG. 15, Vc1 represents acceleration of the capstan motor and Vr represents acceleration of reel motor. More specifically, when the magnetic tape is transported in the fast forward mode or in the rewind mode, even if the capstan is driven by the acceleration Vc1 of the capstan motor till a time point t1, the resultant fluctuation amount is absorbed by the operation of the tension arm shown in FIG. 14. Therefore, the acceleration of the capstan motor is made equal to the acceleration Vr of the reel motor at a time point just before the range in which the fluctuation amount can be absorbed by the operation of the tension arm, that is, at a time point t1 as shown by the dashed line V'c1.

Incidentally, with respect to the angular error, a small level is sliced and the range of $\pm \theta x$ may be employed as a dead zone relative to the operation angle $\pm \theta$ of the tension arm TA. Alternatively, the angular error may be detected by a differentiator so that the angular error may be fed back only in the transition period. Further, it is possible that the switch is actuated and the servo system is effected in the shuttle mode in which the transient change is large, while the servo system is turned OFF in other modes.

In accordance with the above-mentioned arrangement, the transient change of the capstan motor Mc can be damped so that, regardless of the size of the tape cassette of the cassette tape and the diameter of the tape wound around the cassette reel, the transport velocity of the magnetic tape TP can be stably increased and decreased.

An arrangement of a third embodiment of the present invention will hereinafter be explained with reference to FIG. 16.

Figure 6:
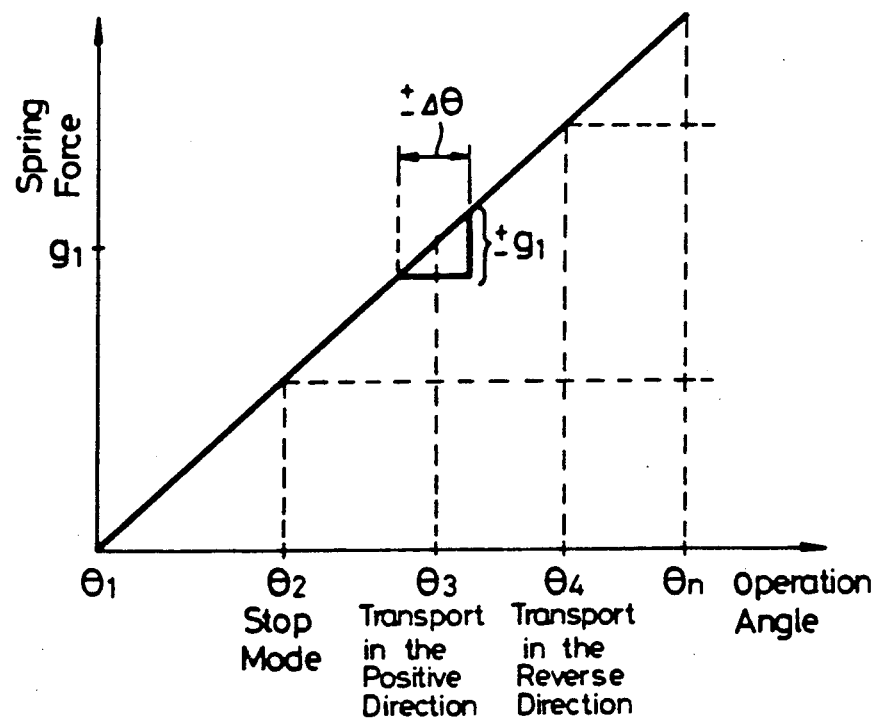
FIG. 6 is a graph of operation angle versus spring force, and to which references will be made in explaining the operation of the tension arm of the example of the tape transport system of the conventional digital video tape recorder shown in FIG. 1.
Figure 7:
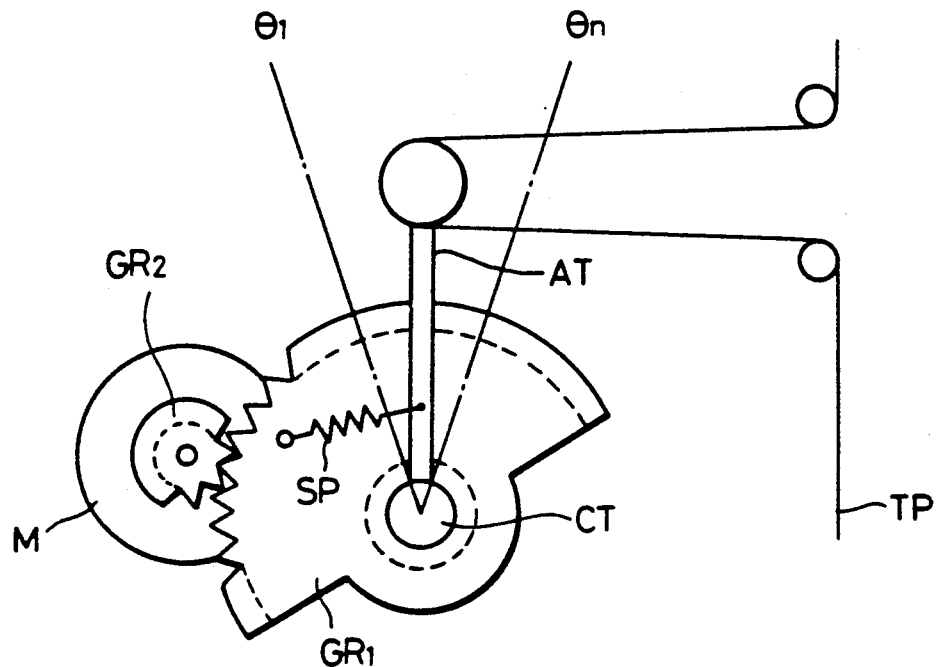
FIG. 7 is a schematic diagram showing an arrangement of a tension arm according to a second example of the prior art.
Figure 8:
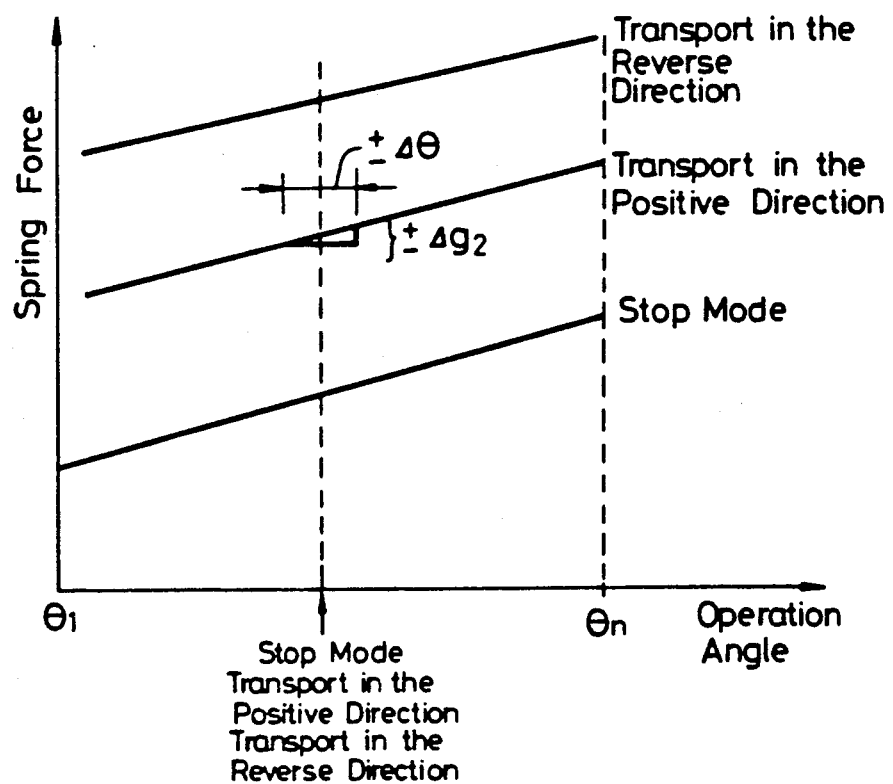
FIG. 8 is a graph of operation angle versus spring force of the tension arm according to the example of the prior art shown in FIG. 7.
Figure 9:
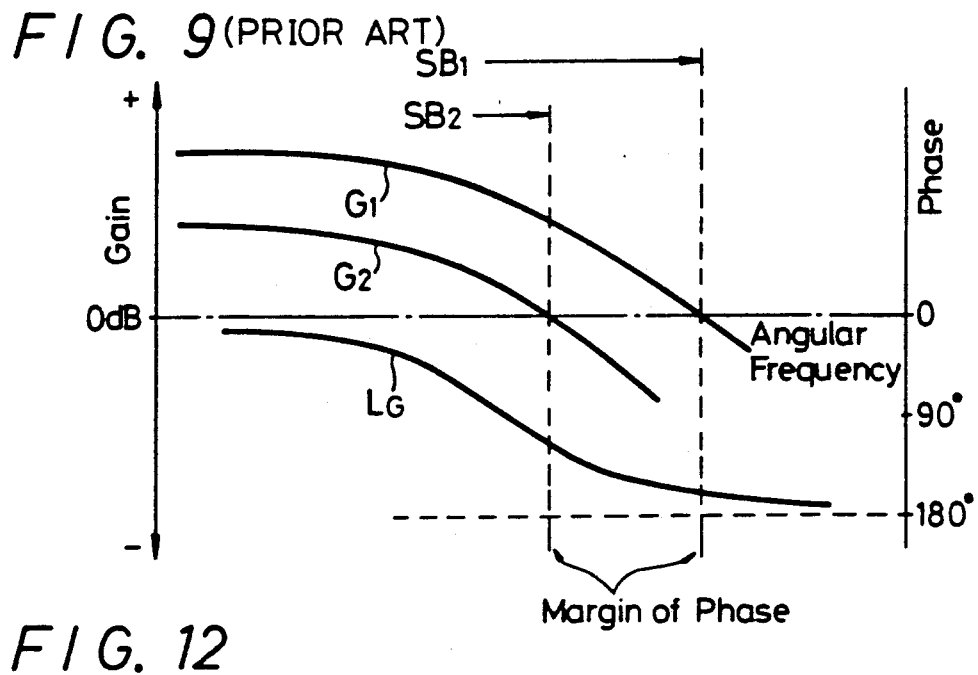
FIG. 9 is a graph of phase versus gain of the tension arm according to the example of the prior art shown in FIG. 7.
Figure 16:
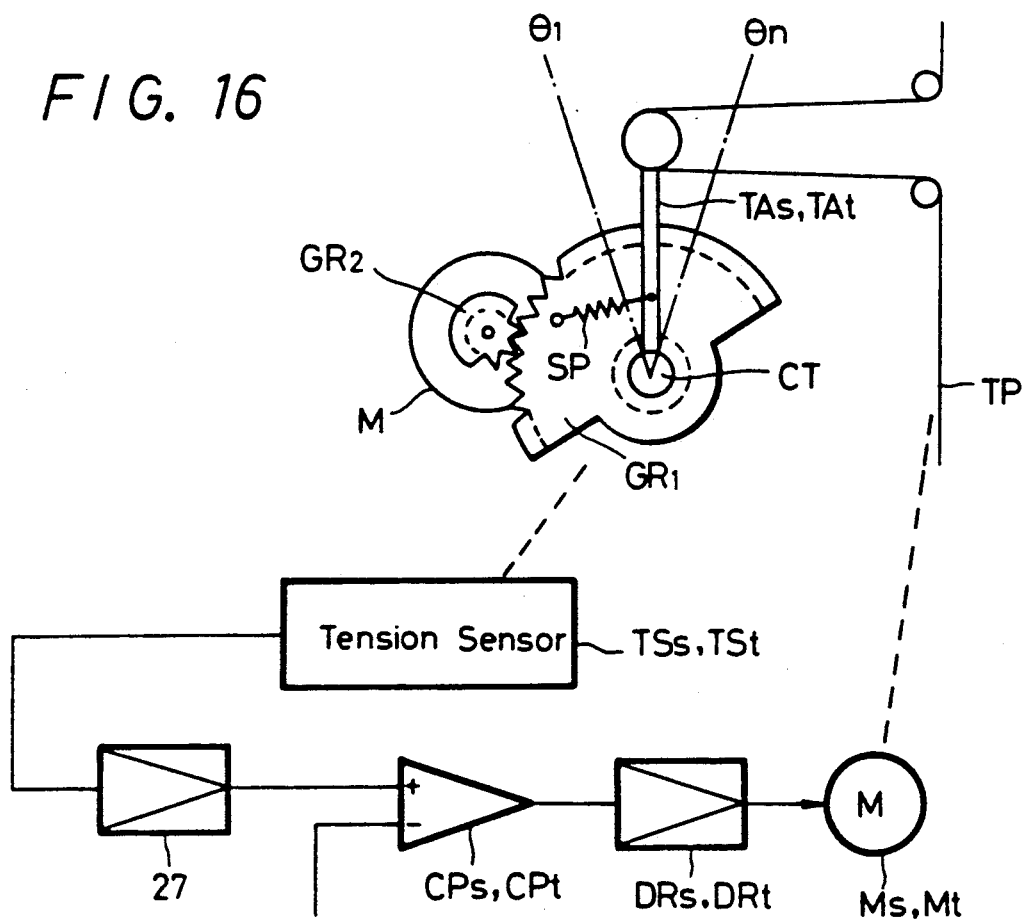
FIG. 16 is a schematic block diagram showing one portion of a third embodiment of the tape transport system according to the present invention, and to which references will be made in explaining a servo system thereof.

As shown in FIG. 16, the tension arm TA (TAs and TAt) used in the digital video tape recorder of the friction type capstan drive system similar to the example of the prior art shown in FIG. 1 is arranged such that, similarly to the example of the prior art shown in FIG. 7, one end of the spring SP is in engagement with one end of the arm TA, the other end thereof is in engagement with one portion of the sector gear GR1 and that the sector gear GR1 is driven by the stepping motor M via the small gear GR2 which is meshed with the sector gear GR1. In the respective modes such as when the magnetic tape TP is transported in the reverse direction, in the positive direction and is stopped in transport, the operation angle of the arm TA lies on a central point of $\theta 1$ to $\theta n$, and the characteristic in which the spring force of the spring SP is changed becomes gentle as compared with that of FIG. 6, similarly to FIG. 8. Consequently, in the servo system for servo-controlling the reel motor, assuming that accuracy of tension applied to the magnetic tape is a loop gain of a range of from $\pm \Delta \theta$ similarly to FIG. 6, then the loop gain becomes $g1 \pm \Delta g2$, whereby accuracy of tension is increased as compared with that of FIG. 6 and the loop gain is lowered, thus the stability of the servo system is maintained.

Figure 17:
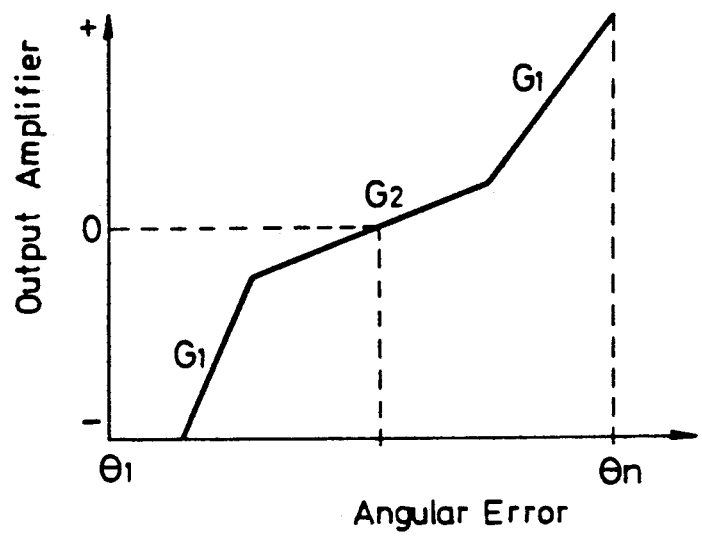
FIG. 17 is a graph of gain characteristic to which references will be made in explaining an operation of the third embodiment of FIG. 16.

A drive amplifier 27 is provided to amplify the detected outputs from the take-up side and supply side tension sensors TSt and TSs which detect tape tensions by detecting the angles of the take-up reel side and supply reel side tension arms TAs and TAt. The detected outputs amplified by the drive amplifier 27 are supplied to the level comparators CPs and CPt. As shown in FIG. 17, the gain of the drive amplifier 27 is decreased as shown by G2 when the angular errors of the take-up reel side and supply reel side tension arms TAs and TAt are small, while the gain of the drive amplifier 27 is increased as shown by G1 when the angular errors of the tension arms TAs and TAt are large. In FIG. 17, the abscissa represents the angular errors of the tension arms TAs and TAt and the ordinate represents the output of the drive amplifier 27.

According to the third embodiment of FIG. 16, since the gain of the drive amplifier 27 is increased when the angular errors of the tension arms TAs and TAt are large, the servo band can be made sufficiently wide to thereby improve a response characteristic of the servo loop. Further, when the angular errors of the tension arms TAs and TAt are small, the phase margin becomes enough so that the stable servo loop can be formed.

According to a first aspect of the present invention, a tape transport apparatus of friction type capstan drive system is provided, in which a revolution rate of a capstan motor for rotating a friction capstan is detected, the capstan motor is servo-controlled on the basis of a velocity command signal and a rotation detection signal, for the friction capstan, a tape tension at a take-up reel side of the friction capstan is detected, a take-up reel motor is servo-controlled on the basis of a detected output, a tape tension at a supply reel side of the friction capstan is detected and a supply reel motor is servo-controlled on the basis of a detected output and a tape transport velocity. In that case, detected outputs from take-up reel side and supply reel side tape tension sensors are supplied to a servo circuit so that, regardless of the change of amount of the tape wrapped around the tape reel, the revolution rate of the capstan can be increased and decreased by the maximum acceleration characteristics of the reel motors.

According to a second aspect of the present invention, since a revolution of a capstan which rotates a friction capstan is detected, the capstan motor is servo-controlled on the basis of a velocity command signal and a rotation detection signal, for a friction capstan, a tape tension at a take-up reel side of the friction capstan is detected, the take-up reel motor is servo-controlled on the basis of the detected output such that a constant rewind tape tension is applied to the tape, a tape tension at the supply reel side of the friction capstan is detected, back tension data determined in response to a tape transport velocity data based on the rotation detected output of the friction capstan motor and a drive current flowed to the capstan motor is stored in a memory and the supply reel motor is servo-controlled on the basis of the back tension data read out from the memory and the detected output from the supply reel side tape tension sensor, the tape can be controlled so as to be transported stably with high accuracy regardless of the tape transport velocity.

In accordance with a third aspect of the present invention, a tape transport apparatus is provided, in which a rotation of a capstan motor which rotates a friction capstan is detected by a rotation detector, the capstan is servo-controlled on the basis of a velocity command signal and a rotation detection signal from the rotation detector, a tape tension at a take-up reel side of the friction capstan is detected by a take-up reel side tape tension sensor composed of a tension arm spring-biased by a spring and a detector for detecting a rotational angle of the tension arm, the take-up reel motor is servo-controlled on the basis of a detected output, a tape tension at a supply reel side of the friction capstan is detected by a supply reel side tape tension detector composed of a tension arm spring-biased by the spring and a detector for detecting a rotational angle of the tension arm and the supply reel motor is servo-controlled on the basis of the detected output. In that case, the take-up reel side and supply reel side tape tension sensors are provided with moving means for moving supporting points of the springs in response to the tape transport modes and an amplifier whose gain is decreased when angular errors of the tension arms of the take-up reel side and supply reel side tape tension sensors are less than a predetermined value and whose gain is increased when the angular errors are more than the predetermined value, wherein the detected outputs of the take-up reel side and supply reel side tape tension sensors are respectively amplified by the amplifier. Thus, when the angular errors of the tension arms are large, a servo band can be made wide sufficiently, while when the angular errors are small, a stable servo loop can be formed.

Figure 18:
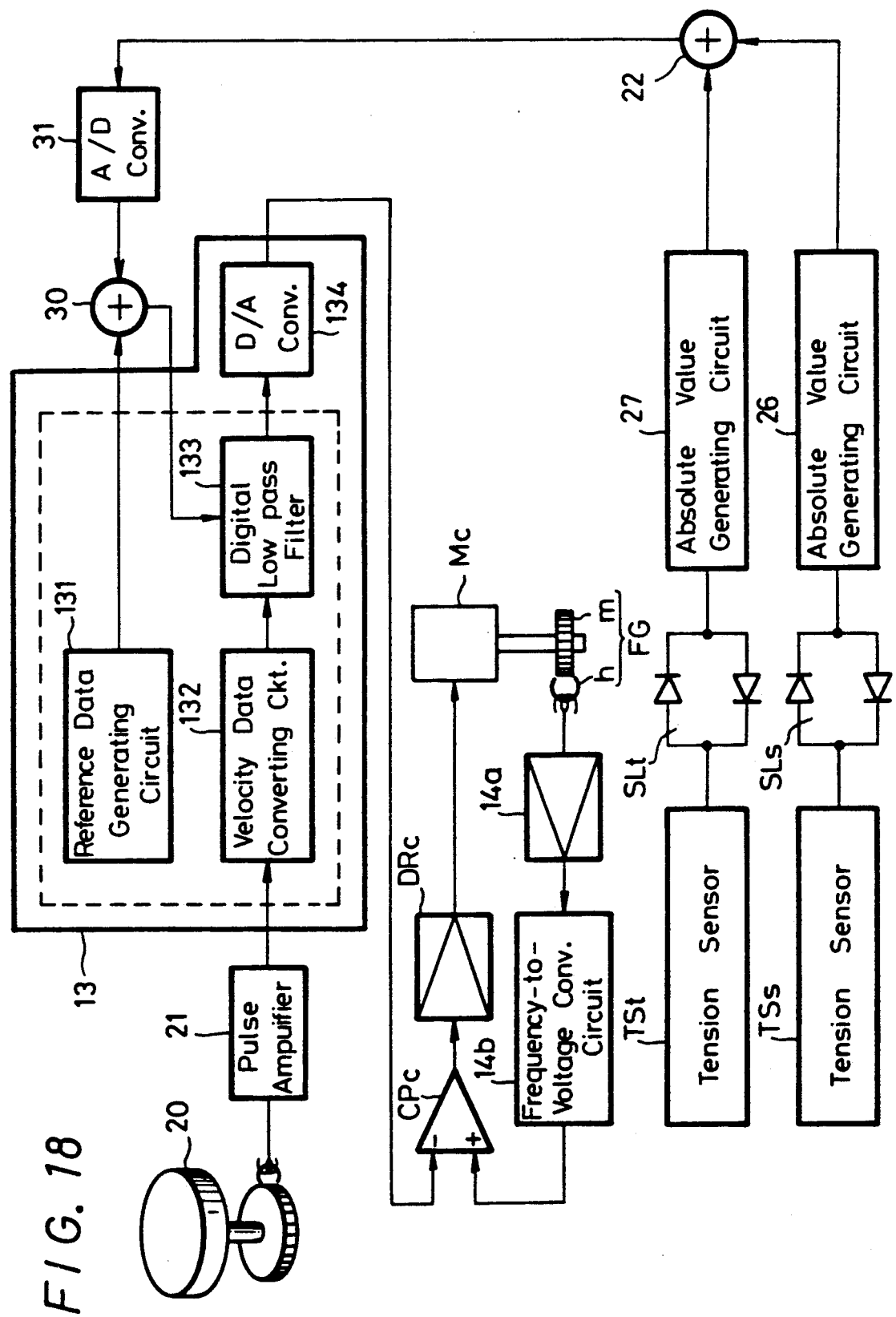
FIG. 18 is a schematic block diagram showing a modified example of the second embodiment of FIG. 13.

The second embodiment shown in FIG. 13 is modified as, for example, shown in FIG. 18. In FIG. 18, like parts corresponding to those of FIG. 13 are marked with the same references and therefore need not be described in detail.

As shown in FIG. 18, a tape velocity control signal formed of a pulse train is generated by a jog dial 20, and this tape velocity control signal is supplied through a pulse amplifier 21 to a velocity data converting circuit 132 in the velocity control voltage generating circuit 13. The tape velocity data converting circuit 132 converts the pulse train into velocity data, and the velocity data from the velocity data converting circuit 132 is supplied through a digital low-pass filter 133 to a D/A converter 134, in which it is converted into an analog reference voltage. This analog reference voltage is supplied to the comparator CPc which forms one portion of the capstan motor drive circuit. The digital low-pass filter 133 is adapted to prevent the velocity reference voltage from being changed suddenly when the jog dial 20 is operated rapidly.

A time constant of the digital low-pass filter 133 is determined by a reference data generating circuit 131. Particularly in the circuit arrangement of FIG. 18, tension data are generated from the tension sensors TSt and TSs, and the tension data are supplied to the absolute value generating circuits 26 and 27, in which they are processed to provide absolute values. These absolute values are added by the adder 22 and the added data is supplied through an A/D converter 31 to an adder 30, whereat it is added to time constant reference data from the time constant reference data generating circuit 131. Then, the time constant of the digital low-pass filter 133 is switched by the added result. Accordingly, when the jog dial 20 is rapidly rotated, if the inertia of the reel motor is large compared with that of the capstan motor, the sum of absolute values of the tension data is increased. To correct the increased sum of the absolute values, or in order that the response velocity of the capstan motor may become close to that of the reel motor, the time constant of the digital low-pass filter 133 is increased. According to the change of the time constant, the loop gain characteristic of the capstan servo circuit can be changed from Vc1 to V'c1 at a certain time point t1 as shown in FIG. 15. Therefore, according to the modified example of FIG. 18, the servo loop can be servo-controlled with a response characteristic of velocity as high as possible such that tape tensions at an entrance position and at an exit position of the capstan can be made substantially the same regardless of the inertia of the reel motor.

Having described preferred embodiments of the invention with reference to the accompanying drawings, it is to be understood that the invention is not limited to those precise embodiments and that various changes and modifications could be effected by one skilled in the art without departing from the spirit or scope of the novel concepts of the invention as defined in the appended claims.

I claim as my invention:

1. A tape transport apparatus comprising:
   (a) a friction type capstan servo block having a friction type capstan driven by a capstan motor controlled by a capstan servo circuit in response to a control signal for determining a velocity of said capstan and to a pulse signal generated in response to rotation of said capstan motor;
   (b) a reel servo block having a supply reel and a take-up reel driven by respective supply and take-up reel motors controlled by supply reel and take-up reel control circuits, respectively,
   (c) first and second tape tension detectors for detecting tape tensions of said tape located between said capstan and said supply reel and between said capstan and said take-up reel respectively;
   (d) a control voltage generator for generating a control voltage;
   (e) a tape tension control data generating circuit having a memory, said memory having stored therein a plurality of back tension characteristics data each of which is changed in response to said pulse signal of said capstan servo block so that a back tension of said supply reel motor is controlled in response to an output signal of said first tape tension detector and said velocity of said capstan motor and a tape tension of said take-up reel is controlled in response to said control voltage and an output of said second tape tension detector;

(f) a memory control circuit having a current detector for detecting a drive current of said capstan motor and a circuit for selecting one of said plurality of back tension characteristics data from said memory in response to an output signal of said current detector so that tape tensions at a tape entrance position and at a tape exit position on said friction capstan can be controlled to become approximately the same regardless of a change of atmospheric conditions; and (g) a gain control circuit connected between said first and second tension detectors and said supply and take-up reel control circuits respectively for controlling a servo gain thereof, so that the gain becomes smaller when a difference between said output signals of said first and second tension detectors is less than a predetermined value and becomes larger when said difference is more than the predetermined value.

2. The tape transport apparatus according to claim 1, further comprising an acceleration control circuit connected between said capstan servo circuit and said first and second supply and take-up tension detectors for controlling an acceleration of said capstan motor when at least one output signal of said first and second tape tension detectors exceeds a predetermined value so that the acceleration of said capstan motor is approximately the same as that of said supply and take-up reels.

3. The tape transport apparatus according to claim 2, in which said acceleration control circuit comprises a switch circuit operable to apply the output signal of said tension detectors when a velocity of the tape is controlled so as to exceed a predetermined velocity.

4. The tape transport apparatus according to claim 3, in which said acceleration control circuit comprises limiters for limiting amplitudes of the output signals from said first and second tape tension detectors and absolute value generators for generating absolute values of output signals of said limiters.

* * * * *